United States Patent
Tripathy

(10) Patent No.: US 11,174,536 B2
(45) Date of Patent: Nov. 16, 2021

(54) TRANSITION METAL-BASED MATERIALS FOR USE IN HIGH TEMPERATURE AND CORROSIVE ENVIRONMENTS

(71) Applicant: Battelle Energy Alliance, LLC, Idaho Falls, ID (US)

(72) Inventor: Prabhat K. Tripathy, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 115 days.

(21) Appl. No.: 16/520,117

(22) Filed: Jul. 23, 2019

(65) Prior Publication Data

US 2020/0063243 A1 Feb. 27, 2020

Related U.S. Application Data

(60) Provisional application No. 62/723,370, filed on Aug. 27, 2018.

(51) Int. Cl.
| | | |
|---|---|---|
| C22C 27/04 | (2006.01) | |
| G21C 3/07 | (2006.01) | |
| C22C 1/04 | (2006.01) | |

(52) U.S. Cl.
CPC .............. *C22C 27/04* (2013.01); *C22C 1/045* (2013.01); *G21C 3/07* (2013.01)

(58) Field of Classification Search
CPC ....... C22C 19/055; C22C 27/04; C22C 1/045; C22F 1/18
See application file for complete search history.

(56) References Cited

U.S. PATENT DOCUMENTS

| | | | |
|---|---|---|---|
| 3,754,902 A | | 8/1973 | Goward et al. |
| 5,122,206 A | * | 6/1992 | Wakita ................. C22C 19/055 148/404 |
| 5,263,349 A | | 11/1993 | Felix et al. |
| 5,595,616 A | | 1/1997 | Berczik |
| 5,964,091 A | | 10/1999 | Fukui et al. |
| 6,127,047 A | | 10/2000 | Worrell et al. |
| 8,491,838 B2 | * | 7/2013 | Hamano ............... C22C 19/056 420/448 |

OTHER PUBLICATIONS

Busby et al., "Radiation-Damage in Molybdenum-Rhenium Alloys For Space Reactor Applications," Journal of Nuclear Materials, vol. 366, (2007), pp. 388-406.
Fabritsiev et al., "The Effect of Rhenium on the Radiation Damage Resistivity of Mo-Re," Journal of Nuclear Materials, vol. 252, (1998), pp. 216-227.
Krajnikov et al., "Embrittlement of Molybdenum-Rhenium Welds Under Low and High Temperature Neutron Irradiation," Journal of Nuclear Materials, vol. 444, (2014), pp. 404-415.
Nanstad et al., "High Temperature Irradiation Effects in Selected Generation IV Structural Alloys," Journal of Nuclear Materials, vol. 392, (2009), pp. 331-340.
Ouyang et al., "Long-Term Corrosion Behaviors of Hastelloy-N And Hastelloy-B3 in Moisture-Containing Molten FLiNaK Salt Environments," Journal of Nuclear Materials, vol. 446, (2014), pp. 81-89.
Simpson, "Developments of Spent Nuclear Fuel Pyroprocessing Technology at Idaho National Laboratory," INL/EXT-12-25124, (Mar. 2012), 23 pages.
Zinkle et al., "Structural Materials for Fission & Fusion Energy," Materials Today, vol. 12, Issue 11, (Nov. 2009), pp. 12-19.

\* cited by examiner

*Primary Examiner* — Jessee R Roe
(74) *Attorney, Agent, or Firm* — TraskBritt

(57) ABSTRACT

A material (e.g., an alloy) comprises molybdenum, rhenium, and at least one element selected from the group consisting of tellurium, iodine, selenium, chromium, nickel, copper, titanium, zirconium, tungsten, vanadium, and niobium. Methods of forming the material (e.g., the alloy) comprise mixing molybdenum powder, rhenium powder, and a powder comprising at least one element selected from the group consisting of tellurium, iodine, selenium, chromium, nickel, copper, titanium, zirconium, tungsten, vanadium, and niobium. The mixed powders may be coalesced to form the material (e.g., the alloy).

17 Claims, 2 Drawing Sheets

TRANSITION METAL-BASED MATERIALS FOR USE IN HIGH TEMPERATURE AND CORROSIVE ENVIRONMENTS

CROSS-REFERENCE TO RELATED APPLICATION

This application claims the benefit, under 35 U.S.C. § 119(e), of U.S. Provisional Patent Application Ser. No. 62/723,370, filed Aug. 27, 2018, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Embodiments of the disclosure relate generally to materials (e.g., alloys) comprising transition metals (e.g., to transition metal-based materials (e.g., transition metal-based alloys)) for application in high-temperature and corrosive environments. More particularly, embodiments of the disclosure relate to molybdenum-rhenium based materials (e.g., molybdenum-rhenium based alloys), and to related methods.

BACKGROUND

Nuclear reactors are used to generate power (e.g., electrical power) using nuclear fuel materials. Nuclear reactors generally include what is referred to as a "nuclear core," which is the portion of the nuclear reactor that includes (e.g., contains) the nuclear fuel material and is used to generate heat from the nuclear reactions of the nuclear fuel material. For example, heat—generated by nuclear reactions carried out within the nuclear fuel materials—may be used to boil water, and the steam resulting from the boiling water may be used to rotate a turbine. Rotation of the turbine may be used to operate a generator for generating electrical power.

To generate sufficient heat to boil water and produce steam, the temperature of fluid(s) flowing out of the nuclear reactor may reach temperatures of approximately 900° C. to 1000° C. Accordingly, the class of materials and, more particularly, the class of high-temperature metallic alloys contemplated for use in nuclear reactors must maintain their mechanical strength (e.g., tensile strength) at high temperatures as these alloys are subjected to thermomechanical stresses during use and operation of the reactors. Corrosion of reactor components may result from impurities in the coolant used in the reactor core, such as molten fluoride salts in molten salt reactors (MSRs). Corrosion of the high-temperature metallic alloys is typically accelerated by high temperatures. Furthermore, reactor components are subject to high-energy neutron irradiation and degradation (e.g., corrosion) as a result of chemical interaction with one or more gaseous elements produced during a nuclear reaction (e.g., nuclear fission). More particularly, the metallic alloys of the reactor components may be subject to intergranular corrosion and, as a result, embrittlement of the metallic alloy due to reaction of the one or more reactive gaseous elements produced during the nuclear reaction at the grain boundaries of the metallic alloy.

Metallic alloys currently used in nuclear reactors include steel alloys, such as 316 stainless steel, 304 stainless steel, 2.5Cr-2Mo steel, 9Cr-1Mo-V steel, chromium-based alloys, and nickel-based alloys, such as INCONEL® 617 (a nickel-chromium alloy), Alloy 800H/HT® (an iron-nickel-chromium alloy), or HASTELLOY N (a nickel-based alloy). However, while these metallic alloys are substantially resistant to corrosion in molten salts (e.g., molten fluoride salts) within the nuclear reactor, these materials suffer from intergranular corrosion with the reactive gaseous elements and do not maintain their mechanical strength at temperatures greater than 700° C., which collectively reduce the service life of the reactor components formed therefrom.

BRIEF SUMMARY

Disclosed is a material comprising molybdenum (Mo) and rhenium (Re). The material further comprises at least one element selected from the group consisting of tellurium (Te), iodine (I), selenium (Se), chromium (Cr), nickel (Ni), copper (Cu), titanium (Ti), zirconium (Zr), tungsten (W), vanadium (V), and niobium (Nb).

Also disclosed is a structure for use in a high-temperature application. The structure comprises a body comprising an alloy of molybdenum (Mo), rhenium (Re), and at least one element selected from the group consisting of tellurium (Te), iodine (I), selenium (Se), chromium (Cr), nickel (Ni), copper (Cu), titanium (Ti), zirconium (Zr), tungsten (W), vanadium (V), and niobium (Nb).

Further disclosed is a structure for use in an electro-chemical reduction process. The structure comprises a body comprising an alloy of Mo; Re; at least one element selected from the group consisting of Te, I, Se, Cr, Ni, Cu, Ti, Zr, W, V, and Nb; and at least one platinum group metal.

Moreover, disclosed is a method of forming a material. The method comprises mixing powders. The powders, for the mixing, comprise Mo, Re, and at least one element selected from the group consisting of Te, I, Se, Cr, Ni, Cu, Ti, Zr, W, V, and Nb. The powders are coalesced to form an alloy of the Mo, the Re, and the at least one element.

DETAILED DESCRIPTION

Figure 1:
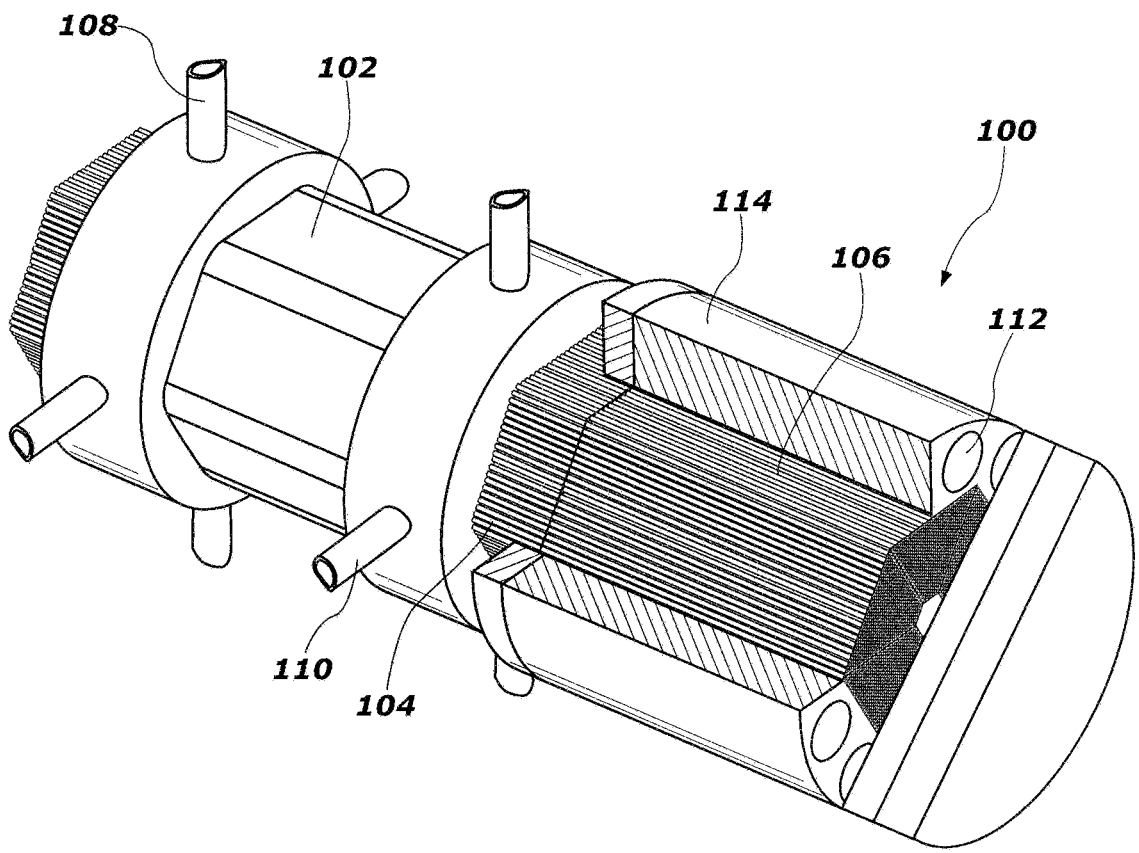
FIG. 1 is a simplified cut-away perspective view of a reactor core operably coupled to a heat exchanger of a nuclear reactor, wherein one or more components thereof may include a body formed of material (e.g., an alloy) disclosed herein.

The following description provides specific details, such as material types and processing conditions, in order to provide a thorough description of embodiments described herein. However, a person of ordinary skill in the art will understand that the embodiments disclosed herein may be practiced without employing these specific details. Indeed, the embodiments of the disclosure may be practiced in conjunction with conventional fabrication techniques employed in the industry. In addition, the description provided below does not form a complete process flow, apparatus, or system for forming a component of a nuclear reactor, another structure, or related methods. Only those process acts and structures necessary to understand the embodiments of the disclosure are described in detail below. Additional acts to form a component of a nuclear reactor core or another structure may be performed by conventional techniques. Further, any drawings accompanying the present application are for illustrative purposes only and, thus, are not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may," when used with respect to a material, structure, feature, or method act, indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, even at least 99.9% met, or even 100.0% met.

As used herein, the terms "about" or "approximately," when used in reference to a numerical value for a particular parameter, are inclusive of the numerical value and a degree of variance from the numerical value that one of ordinary skill in the art would understand is within acceptable tolerances for the particular parameter. For example, "about" or "approximately," in reference to a numerical value, may include additional numerical values within a range of from 90.0% to 110.0% of the numerical value, such as within a range of from 95.0% to 105.0% of the numerical value, within a range of from 97.5% to 102.5% of the numerical value, within a range of from 99.0% to 101.0% of the numerical value, within a range of from 99.5% to 100.5% of the numerical value, or within a range of from 99.9% to 100.1% of the numerical value.

As used herein, the term "and/or" includes any and all combinations of one or more of the associated listed items.

Materials (e.g., alloys) of the disclosure may be formulated and configured for use in high-temperature, corrosive environments, such as for forming one or more components of a nuclear reactor. As used herein, "high temperature" and "high-temperature" each refer to a temperature greater than or equal to about 600° C., such as temperatures greater than or equal to about 700° C. Materials (e.g., alloys) of the disclosure may primarily comprise one or more transition metals as described in the article entitled "A New Metallic Material for Use in High Temperature and Corrosive Environment," attached as Annex A to U.S. Provisional Patent Application Ser. No. 62/723,370, filed Aug. 27, 2018, the benefit of which provisional application is hereinabove claimed, and which article is incorporated in its entirety by reference herein. In some embodiments, materials of the disclosure may comprise, consist essentially of, or consist of a "transition metal-based material" (e.g., a "transition metal-based" alloy).

The transition metal-based material may comprise an alloy of (1) at least one 4 d transition metal (e.g., a transition metal having an atomic number between and including 39 and 48 (e.g., molybdenum (Mo))); (2) at least one 5 d transition metal (e.g., a transition metal having an atomic number of 57 and between and including 72 and 80 (e.g., rhenium (Re))); and (3) in some embodiments, at least one 3 d transition metal (e.g., a transition metal having an atomic number between and including 21 and 30 (e.g., titanium (Ti), vanadium (V))). The 4 d transition metal of the material (e.g., the alloy) may exhibit a body centered cubic (bcc) crystal structure. The 5 d transition metal of the material (e.g., the alloy) may exhibit a hexagonal close packed (hcp) and/or a face centered cubic (fcc) crystal structure. In embodiments in which the material (e.g., the alloy) also includes a 3 d transition metal, the 3 d transition metal may exhibit a body centered cubic (bcc) or hexagonal close packed (hcp) crystal structure.

The material may comprise, primarily, an alloy of molybdenum (Mo) (a 4 d transition metal that may exhibit a bcc crystal structure) and rhenium (Re) (a 5 d transition metal that may exhibit an hcp crystal structure). The concentration of molybdenum (Mo) within the material (e.g., the alloy) may extend in a range of from about 47 weight percent (wt %) to about 90 wt %, or in a range of from about 70 wt % to about 80 wt %. Molybdenum (Mo) may be selected to provide the alloy with a high melting point (e.g., about 2630° C.) suitable for high-temperature environments and corrosion resistance in environments comprising one or more corrosive fluids. Corrosive fluids may include nuclear reactor coolants, such as molten fluoride salts and/or oxidizing agents. However, molybdenum (Mo) may be subject to brittle fracture at high temperatures.

The ductility of molybdenum (Mo) at high temperatures may be increased by the addition of rhenium (Re). Like molybdenum (Mo), rhenium (Re) has a high melting temperature (e.g., 3186° C.) suitable for high-temperature environments. Accordingly, molybdenum-rhenium alloys maintain their mechanical strength in high-temperature environments. The addition of rhenium (Re) may also improve stability and resistance of the material (e.g., the alloy) to irradiation corrosion and to corrosion by the corrosive fluids, and the addition of rhenium (Re) may also improve formability and/or weldability of the material (e.g., the alloy) for forming one or more structures of a nuclear reactor. The concentration of rhenium (Re) within the material (e.g., the alloy) may extend in a range of from about 1 wt % to about 55 wt %, from 1 wt % to about 50 wt %, from about 10 wt % to about 53 wt %, or from about 18 wt % to about 30 wt %.

The material comprising the molybdenum-rhenium alloy may further comprise a grain-boundary-strengthening element formulated to inhibit (e.g., reduce) reactivity of the material with one or more reactive gaseous elements (e.g., fission products), which may be produced from nuclear reaction(s) carried out within the reactor, in the environment of the component part formed from or comprising the material (e.g., the alloy). Fission products may include, but are not limited, to selenium, iodine, and tellurium. Accordingly, the grain-boundary-strengthening element(s) of the material (e.g., the alloy) may be selected from the group consisting of tellurium (Te), iodine (I), selenium (Se), chromium (Cr), nickel (Ni), copper (Cu), titanium (Ti), zirconium (Zr), tungsten (W), vanadium (V), and niobium (Nb). Therefore, in some embodiments, the grain-boundary-strengthening element(s) of the material (e.g., the alloy) may comprise, consist essentially of, or consist of 3 d transition metals (e.g., chromium (Cr), nickel (Ni), copper (Cu), titanium (Ti), and vanadium (V)). In other embodiments, the grain-boundary-strengthening element(s) of the material (e.g., the alloy) may comprise, consist essentially of, or consist of elements outside of the 3 d transition metals category.

In some embodiments, the material (e.g., the alloy) may comprise compounds of one or more of the foregoing grain-boundary-strengthening elements. The concentration of the foregoing elements and/or compounds in the material (e.g., the alloy) may extend in a range of from about 0.5 wt % to about 10 wt %, or in a range from about 1 wt % to about 2 wt %.

In some embodiments, the material of the disclosure may be a ternary alloy comprising three different elements, including molybdenum, rhenium, and one of the grain-boundary-strengthening elements (e.g., tellurium). Therefore, the material may comprise, consist essentially of, or consist of a Mo—Re—Te ternary alloy. In some such embodiments, the ternary alloy may comprise, consist essentially of, or consist of 47 wt % to 90 wt % molybdenum (Mo), 10 wt % to 53 wt % rhenium (Re), and 0.5 wt % to 10 wt % tellurium (Te). In other such embodiments, the ternary alloy may comprise, consist essentially of, or consist of 70 wt % to 80 wt % Mo, 18 wt % to 30 wt % Re, and 1 wt % to 2 wt % Te. A Mo—Re—Te ternary alloy, according to embodiments of the disclosure, may be used to form structure bodies that are configured and conducive for stable use at high temperatures (e.g., at temperatures of greater than 900° C. (e.g., at temperatures from 900° C. to 1100° C.)). Therefore the material (e.g., the alloy (e.g., the Mo—Re—Te ternary alloy)) of embodiments of the disclosure may be formulated and conducive for use in forming bodies to be used in or around high-temperature, corrosive environments, such as in molten salt reactors (e.g., in or around liquid fluoride salts), as well as in other high-temperature environments.

In other embodiments, the material of the disclosure may comprise two or more of the grain-boundary-strengthening elements (e.g., in addition to molybdenum and rhenium) and may be a quaternary alloy, a quinary alloy, and so forth. By way of non-limiting example, the material (e.g., the alloy) of the disclosure may consist of molybdenum, rhenium, tellurium, iodine, and selenium.

Without being bound by any particular theory, the inclusion of one or more of the foregoing grain-boundary-strengthening elements—which are irradiation fission products in a nuclear reaction—in the material (e.g., the alloy (e.g., the molybdenum-rhenium based material)) is expected to inhibit (e.g., reduce propensity of) saturation or inclusion of these chemical elements in the form of fission products into the material (e.g., the alloy) during use of the material (e.g., the alloy) within a nuclear reactor. That is, the inclusion of grain-boundary-strengthening element(s) within the material (e.g., the alloy) may increase the chemical potential of the material (e.g., the alloy). Accordingly, the material (e.g., the alloy) disclosed herein may not chemically react with (e.g., may be inert to) the environment in which the material (e.g., the alloy) is used in any manner that degrades the performance of the material (e.g., the alloy). For example, because the material (e.g., the alloy) may already include the grain-boundary-strengthening elements, the material (e.g., the alloy) may not chemically react with the environment in a manner that would introduce such elements in the form of gaseous fission products at grain boundaries, the presence of which gaseous fission products may otherwise result in grain-boundary embrittlement, as previously discussed herein. Concurrently, the material (e.g., the alloy) of this disclosure may exhibit sufficient mechanical strength and ductility at high temperatures. As a result, the service life of a nuclear reactor and/or one or more components thereof, which reactor and/or component(s) may be formed (e.g., entirely or in part) of the material (e.g., the alloy), may be extended relative to conventional reactors and/or components. Such components may include, but are not limited to, inert electrodes, piping, plates, thermowells, rods, sheets, wire, and the like.

In addition to, or as an alternative to, the inclusion of the foregoing grain-boundary-strengthening elements within the material (e.g., the alloy), the molybdenum-rhenium based material (e.g., alloy) may comprise one or more platinum group metals, such as platinum, osmium, iridium, ruthenium, rhodium, and/or palladium. Without being bound by any particular theory, the inclusion of a platinum group metal in the molybdenum-rhenium based material is expected to inhibit (e.g., reduce propensity of) corrosion of the material (e.g., the alloy) or other degradation of the material (e.g., the alloy) in an electro-chemical reduction process for processing nuclear fuels (e.g., oxide fuels) in which the spent fuels are reduced to their constituent materials, such as uranium, plutonium, other transuranium metals (e.g., americium, curium, berkelium, etc.), and/or combinations thereof. Accordingly, the material (e.g., the alloy) disclosed herein may not chemically react with (e.g., may be inert to) the environment in which the material (e.g., the alloy) is used in any manner that degrades the performance of the material (e.g., the alloy), including degradation in an electro-chemical reduction process. By way of non-limiting example, the material (e.g., the alloy) of the disclosure may consist of molybdenum, rhenium, tellurium, iodine, selenium, ruthenium, and iridium.

The material (e.g., the alloy) or a structure (e.g., component) comprising the material (e.g., the alloy) (e.g., the molybdenum-rhenium based material) may be at least partially formed by mixing one or more powders (e.g., particles) of the material constituents (e.g., molybdenum powder, rhenium powder, and grain-boundary-strengthening element powder) and coalescing the powders to form a ternary alloy. In some embodiments, the material (e.g., the alloy) or the structure may be formed by powder metallurgy. In such embodiments, one or more powders (e.g., particles) of the material constituents may be mixed (e.g., blended), compacted, and sintered. In other embodiments, the material (e.g., the alloy) may be formed by a casting process. For example, the material (e.g., the alloy) may be formed using an arc melting process in which the powders of the material constituents may be packed into a crucible and subjected to an electric arc between an electrode (e.g., a tungsten electrode) and the powders provided within the crucible in a reaction chamber. The arc melting process may be repeated such that the material is remelted to form a homogenous material composition. In some embodiments, the reaction chamber may be evacuated (e.g., subject to a vacuum) and/or filled with an inert gas (e.g., argon). In yet further embodiments, the material (e.g., the alloy) may be formed by an additive manufacturing process. For example, the material (e.g., the alloy) may be formed by an electron-beam additive manufacturing process (e.g., electron-beam melting) in which the one or more powders of the material constituents are placed under a vacuum and fused together by subjecting the powder to energy (e.g., heat) generated by an electron beam or other energy source. In yet further embodiments, the material (e.g., the alloy) may be formed by an electrodeposition process or a plasma melting process.

In some embodiments, forming the structure, or at least a portion thereof, using the foregoing processes may result in the structure (or at least the portion thereof) exhibiting a density not yet at full theoretical density. Accordingly, during and/or subsequent to fabrication of the material (e.g., the alloy) and/or structure (or at least the portion thereof) from the material (e.g., the alloy), the material (e.g., the alloy) and/or structure (or at least the portion thereof) may be exposed to annealing conditions (e.g., sintering) to increase the density of the material (e.g., the alloy) and/or the structure (or at least the portion thereof) and reduce a porosity thereof, although some level of porosity may remain after the sintering process. In such embodiments, the sintering process may increase a density of the structure (or at least the portion thereof) to a density within as high as about 98% of the theoretical density, about 99% of the theoretical density, or even about 100% of the theoretical density. The sintering process may further be selected to reduce residual stresses within the structure (or at least the portion thereof), to form a substantially homogeneous (e.g., uniform) composition of the material (e.g., the alloy), and/or to otherwise obtain a desirable phase (e.g., microstructure) within the material (e.g., the alloy). The material (e.g., the alloy) or structure (or at least the portion thereof) comprising the material (e.g., the alloy) formed by any of the foregoing methods may be formed in a substantially near-net-shape of a final structure (e.g., final component). In other embodiments, after formation of the material (e.g., the alloy) or structure (or at least the portion thereof), the structure (or at least the portion thereof) may be subject to one or more shaping processes including, but not limited to, drawing, rolling, stamping, and the like and/or to one or more joining processes including, but not limited to, brazing, welding, explosive cladding (e.g., explosion welding), and the like.

In some embodiments, the sintering process may comprise a furnace heating (e.g., annealing) process at temperatures of between about 100° C. and about 500° C., a hot isostatic pressing, a cold isostatic pressing, an electric current assisted sintering process (e.g., a spark plasma sintering process), a high pressure rapid sintering process, and combinations thereof. Any of the foregoing sintering processes may be conducted under at least a partial vacuum (e.g., total vacuum) and/or in a reducing atmosphere comprises a reducing gas (e.g., hydrogen gas). In some embodiments, the material (e.g., the alloy) may be formed by coalescing powders of the material constituents under an electric field activated sintering process during which a pressure of up to about 10 MPa is applied at temperatures extending in a range from about 1200° C. to about 1600° C. for less than about 1 hour. After sintering, the material (e.g., the alloy) may be furnace cooled. The pressureless sintering process includes sintering under pressures of about $10^{-5}$ Torr (about 0.0013 Pa) at temperatures extending in a range from about 1200° C. to about 1600° C. for a period of between 4 hours and 6 hours.

Illustrated in FIG. 1 are parts of a nuclear reactor that may be formed of, or comprise a component with a body formed of, the material (e.g., the alloy) of any of the embodiments of the disclosure. The nuclear reactor includes a reactor core 100, which may include a plurality of heat pipes 104 extending therethrough. The heat pipes 104 may extend from the reactor core 100 to a heat exchanger 102. During use of the nuclear reactor, a material within the heat pipes 104 may be heated in the reactor core 100 by fuel elements 106 in the reactor core 100, and the heated material in the heat pipes 104 may be cooled in the heat exchanger 102. The heat exchanger 102 may comprise inlet connections 108 for operably coupling the heat exchanger 102 to a heat transfer fluid and outlet connections 110 for discharging a heated heat transfer fluid from the heat exchanger 102. The heat transfer fluid may be heated by the heat pipes 104 in the heat exchanger 102. The heated heat transfer fluid may be used to produce power, as will be understood by those of ordinary skill in the art. The reactor core 100 may be surrounded by a plurality of rotating control drums 112 configured to control a reaction rate of the reactor core 100. A side reflector 114 may surround the reactor core 100. One, more, or all of the components of the nuclear reactor of FIG. 1 may have a body formed of (e.g., comprising, consisting essentially of, consisting of) the material (e.g., the alloy) of any of the embodiments of the disclosure. For example, one or more of the heat exchanger 102 components, the heat pipes 104, the inlet connections 108, the outlet connections 110, the control drums 112, and/or the side reflector 114 may be or may comprise one or more bodies formed of (e.g., comprising, consisting essentially of, or consisting of) the material (e.g., the alloy) of any of the embodiments of the disclosure.

While the materials (e.g., the alloys) disclosed herein have been described as being usable within nuclear reactors or the components thereof, the disclosure is not so limited. The materials (e.g., the alloys) (e.g., the molybdenum-rhenium alloy based materials) disclosed herein may be used in place of nickel-based alloys in high-temperature and corrosive applications. Such applications include, but are not limited to, gas turbine engines for automobiles, aircraft, and spacecraft, including turbine blades, discs, shafts, and other components thereof; for thermal power generation machines, incinerators, blast furnaces, and the like; and/or for oxygen-evolving electrodes for electro-chemical reduction processing of spent nuclear fuel.

Figure 2:
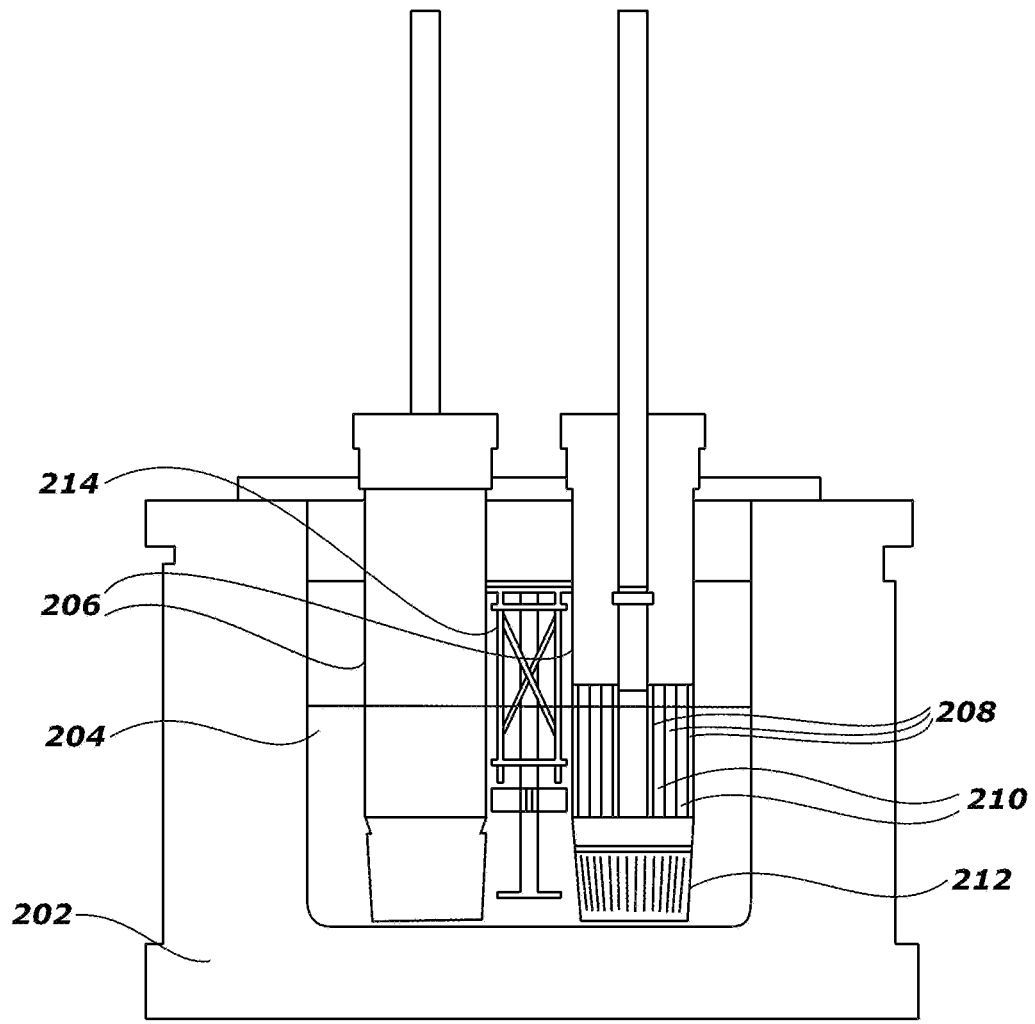
FIG. 2 is a simplified cut-away elevational view of a system for use in electro-chemical reduction processing of spent nuclear fuel, wherein one or more components of the system may include a body formed of material (e.g., an alloy) disclosed herein.

For example, FIG. 2 is a simplified illustration of a system for electro-chemical reduction processing of spent nuclear fuel. The system may include a support structure 202 above which a vessel contains an electrolyte (e.g., salt) 204. Anode/cathode modules 206 extend into the electrolyte 204. In a cathode module of the anode/cathode modules 206, cathode cylinders 208 are disposed adjacent fuel dissolution baskets 210 and above a product bucket 212. A stirrer assembly 214 also extends into the electrolyte 204. (Other details of the system are not illustrated, in the interest of clarity.) One, more, or all of the components of the electro-chemical reduction processing system of FIG. 2 may have a body formed of (e.g., comprising, consisting essentially of, or consisting of) the material (e.g., the alloy) of any of the embodiments of the disclosure. For example, one or more of the components of the anode/cathode modules 206 (e.g., the cathode cylinders 208, the fuel dissolution baskets 210, the product buckets 212), the stirrer assembly 214, etc., may be or may comprise one or more bodies formed of (e.g., comprising, consisting essentially of, or consisting of) the material (e.g., the alloy) of any of the embodiments of the disclosure.

While embodiments of the disclosure may be susceptible to various modifications and alternative forms, specific have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A material, comprising:
    molybdenum;
    rhenium; and
    at least one element selected from the group consisting of tellurium, iodine, selenium, chromium, nickel, copper, titanium, zirconium, tungsten, vanadium, and niobium,
    wherein the molybdenum comprises from about 47 wt % to about 90 wt % of the material.

2. The material of claim 1, wherein the material is a ternary alloy, the molybdenum comprising from about 47 wt % to about 90 wt % of the material, the rhenium comprising from about 10 wt % to about 53 wt % of the material, and the tellurium comprising from about 0.5 wt % to about 10 wt % of the material.

3. The material of claim 1, wherein the material is a ternary alloy, the molybdenum comprising from about 70 wt % to about 80 wt % of the material, the rhenium comprising from about 18 wt % to about 30 wt % of the material, and the tellurium comprising from about 1 wt % to about 2 wt % of the material.

4. The material claim 1, wherein the material is formulated to be substantially chemically unreactive with gaseous fission products of a nuclear reaction.

5. The material of claim 1, wherein the material is an alloy consisting of the molybdenum, the rhenium, the tellurium, the iodine, and the selenium.

6. The material of claim 1, wherein the material is an alloy and further comprises a platinum group metal.

7. The material of claim 1, wherein the material is formulated to be substantially chemically unreactive with products of an electro-chemical reduction process of spent nuclear fuel materials.

8. The material of claim 1, wherein the material is an alloy comprising:
    the molybdenum at the about 47 wt % to the about 90 wt %;
    the rhenium;
    the at least one element selected from the group consisting of the tellurium, the iodine, the selenium, the chromium, the nickel, the copper, the titanium, the zirconium, the tungsten, the vanadium, and the niobium; and
    at least one platinum group metal.

9. The material of claim 8, wherein the at least one platinum group metal comprises ruthenium and iridium.

10. The material of claim 9, wherein the alloy consists of the molybdenum at the about 47 wt % to the about 90 wt %, the rhenium, the tellurium, the iodine, the selenium, the ruthenium, and the iridium.

11. A structure for use in a high-temperature application, the structure comprising a body comprising an alloy of:
    molybdenum;
    rhenium; and
    at least one element selected from the group consisting of tellurium, iodine, selenium, chromium, nickel, copper, titanium, zirconium, tungsten, vanadium, and niobium,
    wherein the molybdenum comprises from about 47 wt % to about 90 wt % of the alloy.

12. The structure of claim 11, wherein the body comprising the alloy is a body comprising a component of a nuclear reactor.

13. The structure of claim 11, wherein the body comprising the alloy is a body comprising a component of a gas turbine engine.

14. A method of forming a material, the method comprising:
    mixing powders comprising:
        molybdenum,
        rhenium, and
        at least one element selected from the group consisting of tellurium, iodine, selenium, chromium, nickel, copper, titanium, zirconium, tungsten, vanadium, and niobium; and
    coalescing the powders to form an alloy of the molybdenum, the rhenium, and the at least one element, the molybdenum comprising about 47 wt % to about 90 wt % of the alloy.

15. The method of claim 14, wherein coalescing the powders comprises subjecting the powders to at least one of a powder metallurgy process, an arc melting process, an additive manufacturing process, a plasma processing step, a casting process, and an electrodeposition process.

16. The method of claim 14, further comprising exposing the alloy to annealing conditions to densify at least a portion of the alloy.

17. The method of claim 14, wherein mixing the powders comprises mixing:
    molybdenum powder,
    rhenium powder, and
    a powder comprising at least one element selected from the group consisting of the tellurium, the iodine, the selenium, the chromium, the nickel, the copper, the titanium, the zirconium, the tungsten, the vanadium, and the niobium.

* * * * *